United States Patent [19]

Finger et al.

[11] Patent Number: 4,626,357
[45] Date of Patent: Dec. 2, 1986

[54] WASTE WATER CONTROL METHOD AND MEANS

[75] Inventors: Frank J. Finger, Highland Park, N.J.; Dominick P. DiChiria, Minneapolis, Minn.

[73] Assignee: American Pollution Controls, Inc., Highland Park, N.J.

[21] Appl. No.: 690,310

[22] Filed: Jan. 10, 1985

[51] Int. Cl.$^4$ .............................................. C02F 1/76
[52] U.S. Cl. .................................... 210/721; 134/13; 134/109; 210/726; 210/744; 210/748; 210/756; 210/804; 210/109; 210/199; 210/201; 210/206; 210/255; 210/257.1
[58] Field of Search ................... 134/10, 13, 109, 123; 210/721, 726, 744, 748, 756, 764, 804, 806, 109, 128, 129, 167, 199–201, 205, 206, 251, 255, 256, 257.1, 260

[56] References Cited

U.S. PATENT DOCUMENTS

| | | | |
|---|---|---|---|
| 2,300,564 | 11/1942 | Godfrey | 210/754 |
| 3,142,638 | 7/1964 | Blaisdell et al. | 210/721 |
| 3,474,033 | 10/1969 | Stout et al. | 210/721 |
| 3,502,215 | 3/1970 | Cahan | 210/167 |
| 3,616,917 | 5/1969 | Hellwege | 210/167 |
| 3,841,116 | 10/1974 | Klein et al. | 210/167 |
| 4,029,114 | 6/1977 | Wiltrout | 134/123 |

FOREIGN PATENT DOCUMENTS 1074928 7/1980 Canada .................. 210/199

Primary Examiner—Peter A. Hruskoci
Attorney, Agent, or Firm—Head, Johnson & Stevenson

[57] ABSTRACT

A waste water control method and means comprising three basic units, a first unit including a flush booth wherein a radiator, or the like, may be exteriorly sprayed and/or interiorly flushed in the usual manner, and a multi-compartmented sump arranged for receiving the fluid draining from the spraying and/or flushing operation; a second unit including a first settling compartment wherein the fluid from the sump is received for a separation of heavy particles or components of the fluid from lighter components thereof, the lighter components of the fluid being directed to a first holding compartment for a chemical bath treatment thereof to substantially eliminate undesirable organic matter from the fluid; and a third unit including a second settling compartment for receiving the fluid from the first holding compartment to provide a final separation of heavier components of the fluid from the lighter components thereof, and a second holding compartment in communication with the second settling compartment for receiving the substantially clean or clear fluid therefrom for ultimate discharge with substantially no pollution damage to the surrounding area.

14 Claims, 7 Drawing Figures

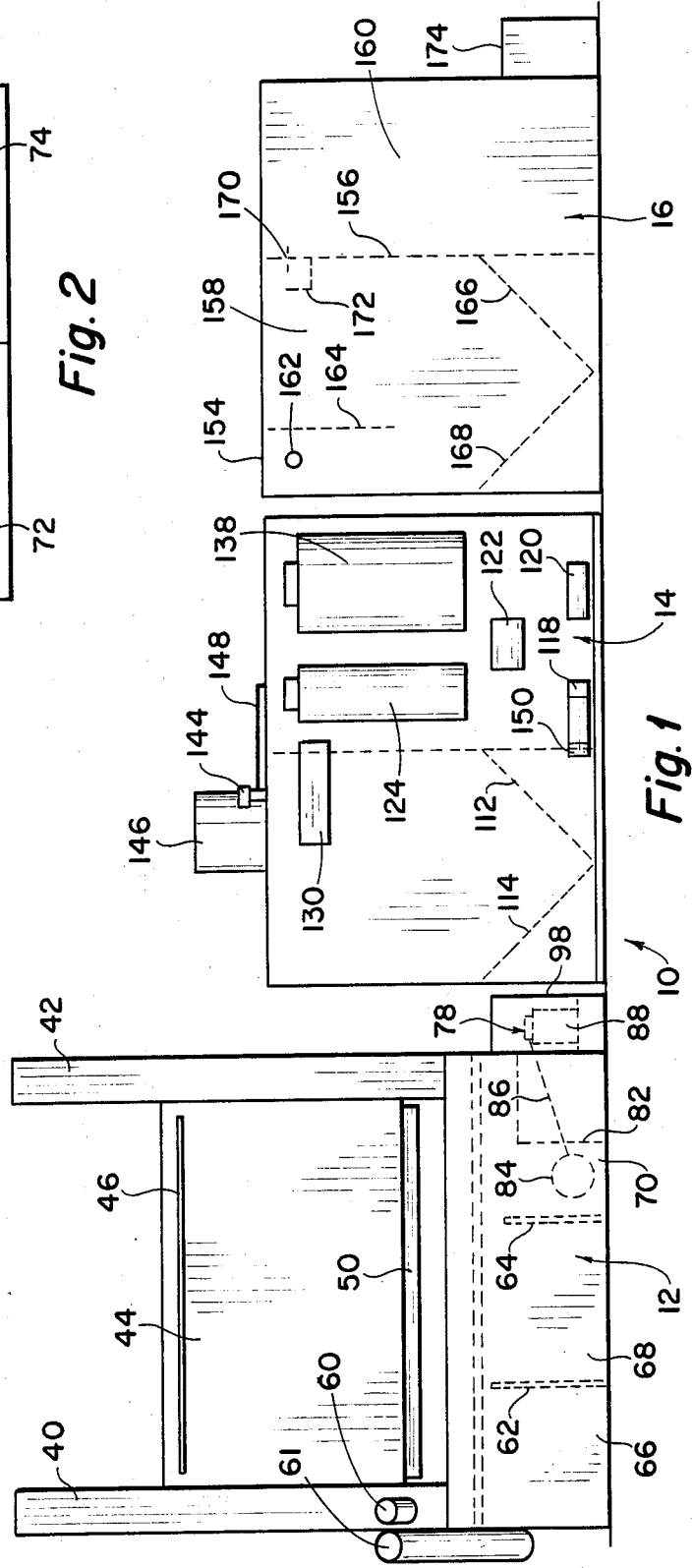
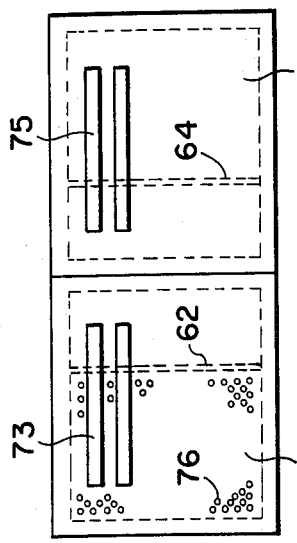

WASTE WATER CONTROL METHOD AND MEANS

BACKGROUND OF THE INVENTION

1. Field of the Invention

This invention relates to improvements in pollution control method and means and more particularly, but not by way of limitation, to a method and means for the reduction of toxic metals and organic substances in radiator shop waste water.

2. Description of the Prior Art

The repair work and other operations performed in connection with radiators results in the discharge of waste water from the establishment which contains toxic metals and organic substances. The presence of these materials in the waste water may be hazardous to both the personnel working in the establishment and to the surrounding area in that the waste water discharging or being "dumped" from the radiator shop may pollute the earth, ground water, or the like. There have been efforts to reduce the content of undesirable materials in waste products, such as shown in the U.S. Pat. Nos. 3,923,616, Atadan et al.; 3,926,752, Loretto et al 3,951,649, Kieswetter, Jr. et al; 3,736,238, Kruesi et al 4,082,629, Milner et al; 4,159,232, Bacon et al; 4,181,588 Wong et al; 4,206,023, Au; 4,312,724, Kammel et al; 4,337,128, Haakonsen et al; and 4,362,607, Ritcey et al. Other solutions to this type problem are found in Chemical Abstracts, Vol. 91, 1979. These references, however, do not appear to solve the problem as specifically to the problems encountered in the waste water being "dumped" or discharged from radiator shops. This waste water has been found to particularly contain lead, copper and zinc, and the presences of the content of these metals in the waste water is highly undesirable.

SUMMARY OF THE INVENTION

The present invention contemplates a novel method and means for reducing the lead, copper and zinc content of the waste water found in radiator shops and comprises a filtration system which utilizes ultraviolet light, hypo chlorite briquettes and ferric chloride liquid. The use of the filtration system has been found to reduce the lead, copper and zinc contents of the waste water to relatively small values, and to values which are considered tolerable upon the discharge of the waste water into the surrounding area. More specifically, the apparatus comprises three basic units, the first of which is a flush booth and sump section wherein the radiator is initially rinsed or flushed with the proper liquid for performing the cleaning or other work operation on the radiator. The flushing liquid is usually a caustic fluid and is directed from the flushing area to the sump area wherein the fluid is cascaded through a plurality of settling or sump compartments. The heaviest particles in the fluid settle in the lower portion of the first compartment, and as the fluid cascades from compartment to compartment, more of the particles are settled out in each compartment. The last of the compartments is provided with a switching means for actuation of a pump for withdrawal of the fluid through a strainer and for directing the fluid into the second unit which is a first settling tank. The fluid is then moved through a calcium hypochlorite chemical bath, and from this chemical bath the water passes into an ultraviolet light area. The combination of the hypochlorite and ultra violet light breaks down the organics in the fluid. It has been found that this step must preferably be accomplished before treatment of the fluid for the release or removal of the heavy metals therefrom in order to achieve an efficient end result. After the fluid leaves the ultra violet station, it is passed through a ferric chloride chemical bath, where it then passes into a reactor tank. The fluid in the reactor tank is constantly stirred or agitated, and the fluid in the reactor tank is monitored for PH readings. The fluid is moved from the reactor tank to a third unit which is a second settling tank. The metals and other contaminates which may remain in the fluid settle to the bottom of the second settling and the clear fluid (usually water) rises to the top. The clear fluid flows over a dam provided in the upper portion of the third unit and may be discharged therefrom for "dumping" or other discarding thereof. The novel method and means for waste water pollution control is simple and efficient in operation and economical in construction.

BRIEF DESCRIPTION OF THE DRAWINGS

FIG. 1 is a front elevational view of a waste water pollution control apparatus embodying the invention.

FIG. 2 is a top view of a sump section utilized in a waste water pollution control apparatus embodying the invention.

DETAILED DESCRIPTION OF THE PREFERRED EMBODIMENT

Figure 3:
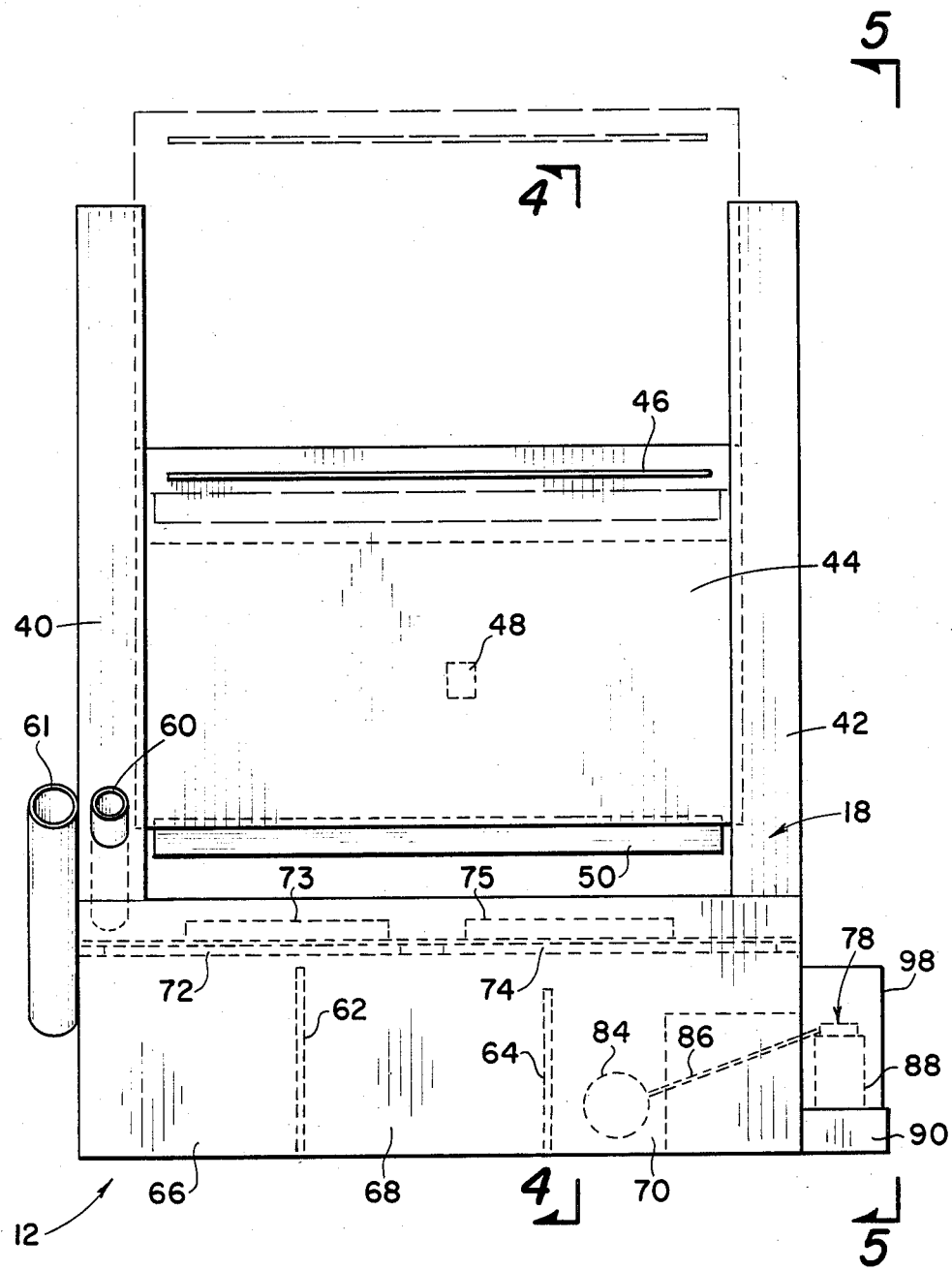
FIG. 3 is an enlarged front elevational view of a first unit utilized in a waste water pollution control apparatus embodying the invention, with portions thereof shown in broken lines for purposes of illustration.

Referring to the drawings in detail, reference character 10 generally indicates a waste water pollution control apparatus comprising three basic units 12, 14 and 16. The unit 12 is a flush unit, and the units 14 and 16 are first and second settling units for receiving the water or fluid in sequence from the flush unit. Contaminated or toxic metal and organic substance fluid is initially received in the flush tank and clean or substantially clear fluid is discharged from the second settling tank.

The flush unit 12 comprises a housing or cabinet 18 preferably constructed from a polypropylene plastic material, but not limited thereto. The cabinet 18 may be of any suitable construction, and as shown herein preferably comprises a bottom plate 22 having front and rear plates 24 and 26 extending substantially perpendicularly upwardly therefrom and opposed side plates 28 and 30 secured therebetween. The front plate 24 is preferably of a shorter length than the rear plate 26 and the side plates 28 and 30 are preferably provided with rearwardly extending angular edge portions 32 and 34, respectively, between the upper edge of the front plate 24 and the upper end of the sideplates, as particularly shown in FIGS. 4 and 5. A top or cover plate 36 is provided for the housing 24 and preferably extends slightly downwardly along the upper portion of the edges 32 and 34 in a direction toward the front wall 24 to provide an opening or window 38 for the cabinet or housing 18.

Figures 4, 5:
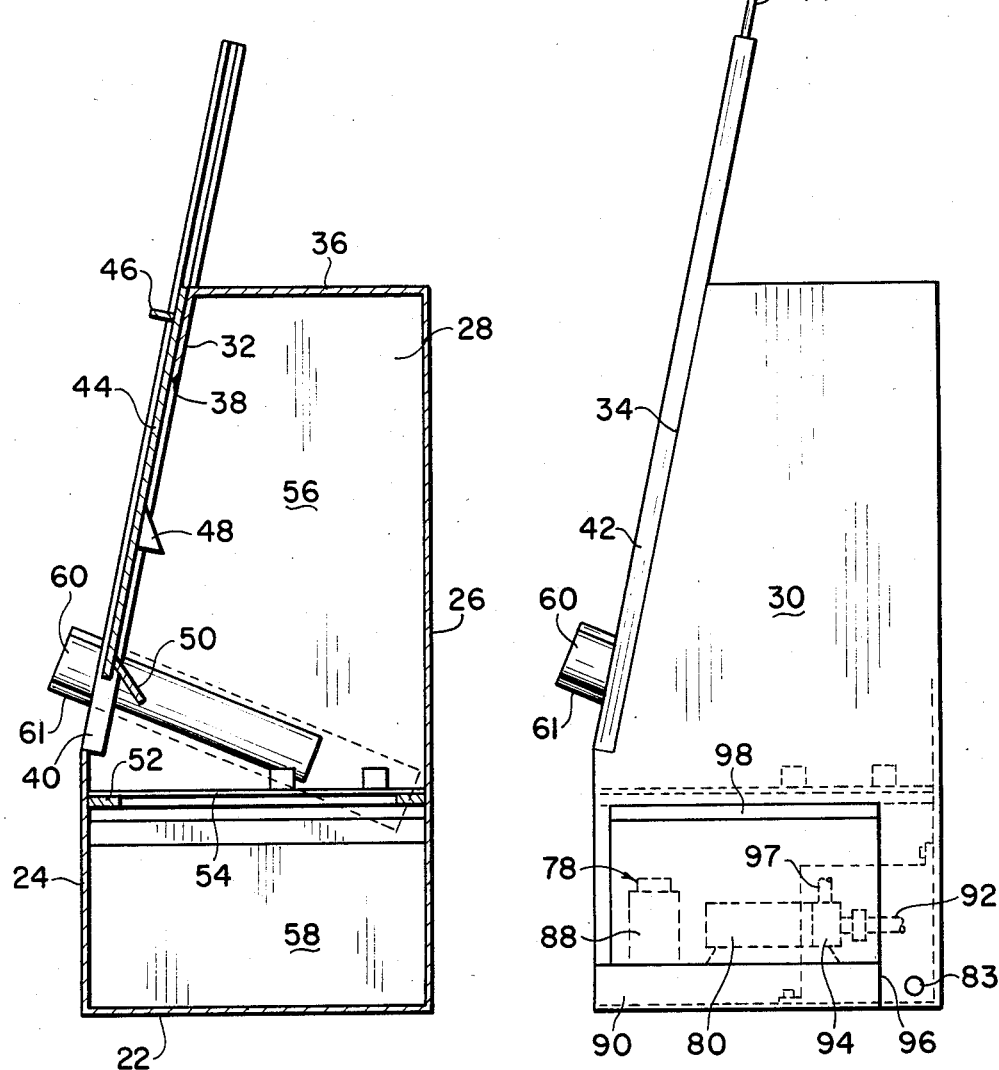
FIG. 4 is a view taken on line 4—4 of FIG. 3.
FIG. 5 is a view taken on line 5—5 of FIG. 3 and shows the door in an up position.
Figure 6:
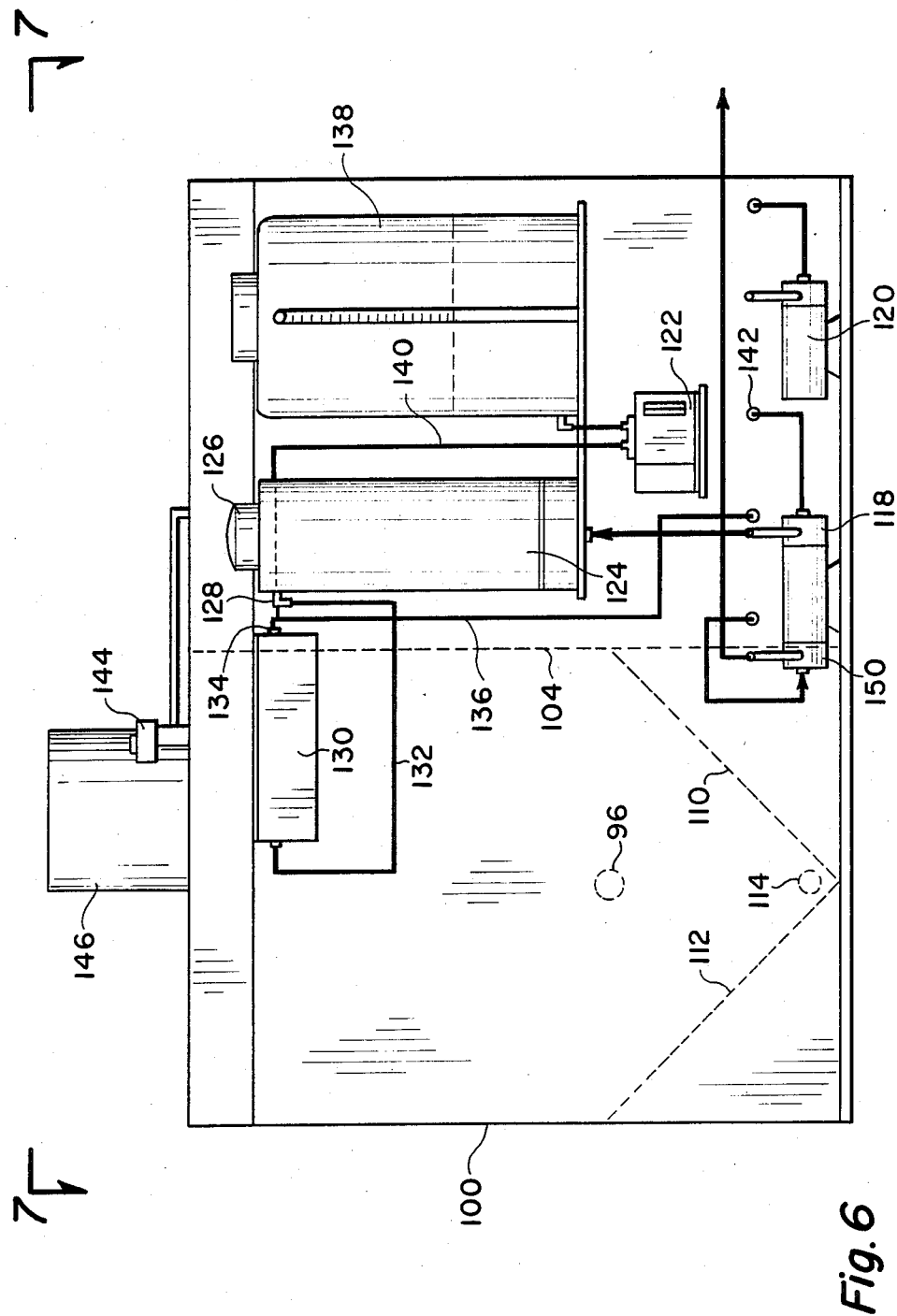
FIG. 6 is an enlarged front elevational view of a second unit utilized in a waste water pollution control apparatus embodying the invention, with portions shown in broken lines for purposes of illustration.
Figure 7:
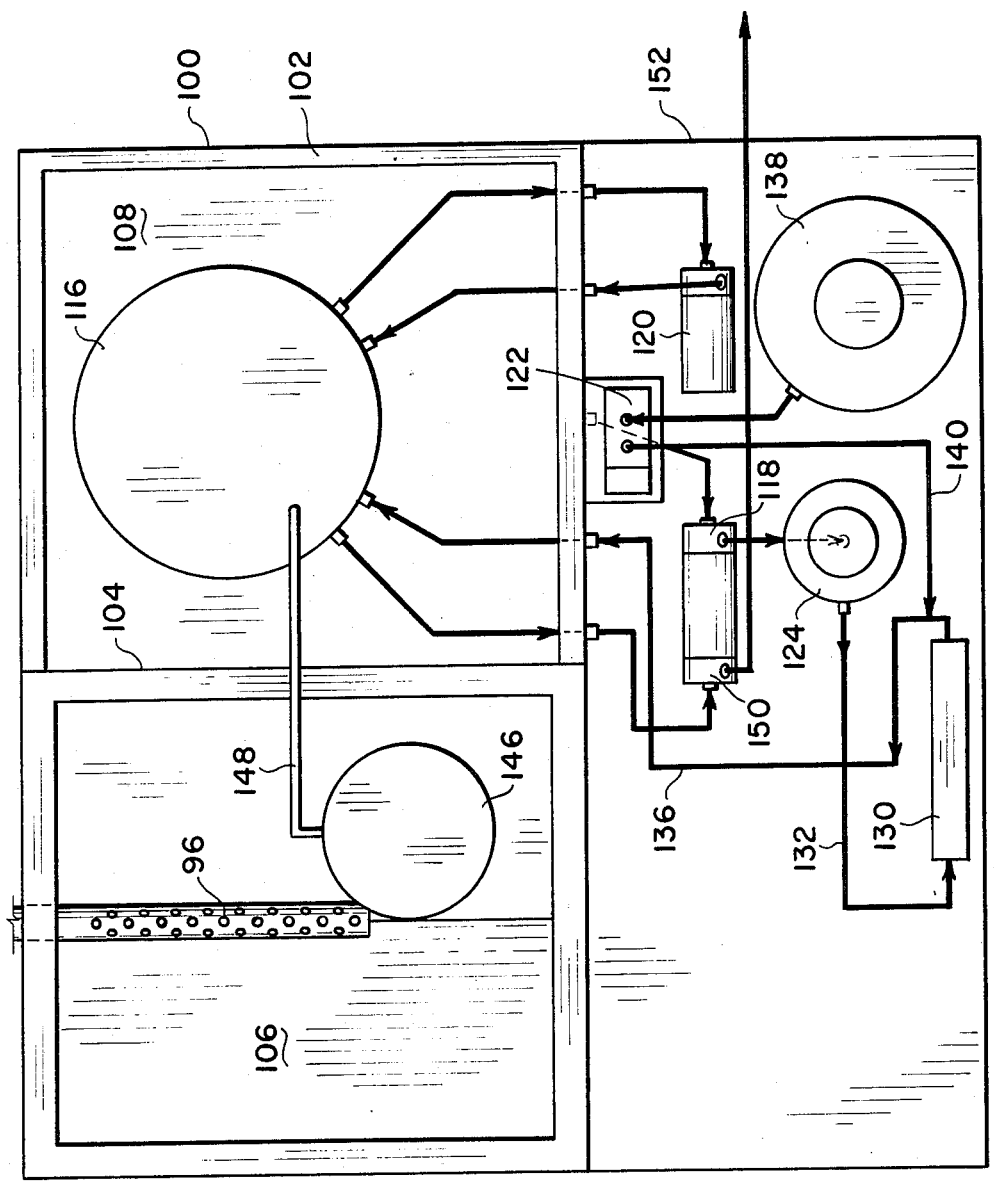
FIG. 7 is a view taken on line 7—7 of FIG. 6.

A pair of substantially identical oppositely disposed rails 40 and 42 are secured to the angular edges 32 and 34, respectively, and extend upwardly beyond the top or cover 36 for slidably receiving a door 44 therebetween. The door 44 may be provided with an outwardly extending flange or handle means 46, if desired, for facilitating the manual movement of the door between an open position as shown in FIG. 4. In addition, suitable catch or latch means 48 may be provided on the door 44 for holding the door in the open position as is well known. The handle means 46 is preferably covered with a suitable protective material, such as rubber for reducing damage thereto from caustic fluids, or the like, during the use of the apparatus. It is also preferable to provide an inwardly directed angular splash guard means 50 in the proximity of the lower end of the door 44 for protection of operating personnel against accidental splashing of the fluids from the housing 18 during a pollution control operation at will be hereinafter set forth. It is to be noted that the full open position of the door 44 preferably provides an opening of approximately forty inches in height for the window 38 whereas the fully closed position of the door 44 provides an opening approximately ten inches in height, but not limited thereto.

The interior of the housing 18 is provided with an inwardly directed flange means preferably extending around the inner periphery thereof for supporting a perforated floor or horizontally disposed partition 54 thereon. The partition 54 separates the interior of the housing 18 into an upper flushing chamber 56 and a lower sump chamber 58. The chamber 56 is particularly designed and constructed for receiving a radiator, or the like (not shown) therein during the initial flushing of the radiator with the usual radiator caustic cleaning fluid, or the like. The fully open position of the door 44 provides access to the interior of the chamber 56 for facilitating the placement of the radiator therein. The radiator disposed within the chamber 56 may be sprayed off on the outside thereof in the usual manner and flushed out inside, in the usual manner. The door 44 may be moved to the closed position thereof during the spraying and/or flushing operation, and the ten inch opening of the window 38 in the closed position of the door accommodate the usual flush nozzle (not shown) normally utilized in the radiator spraying and/or flushing operation. As a practical matter, it is desirable to provide open ended sleeve means or holster means 60 and 61 on the outer periphery of one sidewall, such as the sidewall 28, for removably receiving the usual flush nozzle or nozzles therein when the nozzle or nozzles are not in use, as is well known.

The waste water draining downwardly in the chamber 56 during the spraying and/or flushing operation falls or drains by gravity through the perforate floor or partition 54 and into the sump chamber 58. The sump chamber 58 is provided with a plurality of upright, spaced partitions which separate the sump chamber into a plurality of chambers. As particularly shown herein, two partitions 62 and 64 are provided in the chamber 58, separating the chamber 58 into three sumps 66, 68 and 70. The upper ends of the sumps 66, 68 and 70 are closed by suitable removable cover plates 72 and 74. The cover plates 72 and 74 are preferably provided with suitable handle means 73 and 74, respectively for facilitating manual removal for providing access to the sumps, and installation on the sumps for closing thereof. The partition 62 is of a greater height than the partition 64, as will be particularly apparent in FIGS. 1 and 3.

The cover member 72 placed immediately above or over the sump 70 is provided with a plurality of spaced apertures 76 whereby the water dropping into or accumulating within the sump chamber 58 is initially discharged into or directed into the first sump 66, where the heaviest of any foreign particles present in the fluid settle to the bottom of the sump 66. As the level of the fluid within the chamber or sump 66 rises to the top of the partition 62, the fluid flows or cascades over the top of the partition 62 and into the second sump 68. The heaviest of the particles remaining in the fluid settle to the bottom of the sump 68, and when the level of the fluid within the sump 68 rises to the top of the partition 64, the fluid will cascade over the partition 64 and into the sump 70.

A suitable float actuated switch means 78 is mounted exteriorly of the housing 18 and is operably connected with a suitable pump means 80 for automatic actuation thereof when the level of the fluid in the sump 70 rises to a preselected level, as is well known. The chamber 70 is in communication with the pump means 80 in the usual manner, and a suitable strainer means 82 is disposed around the pump inlet port 83 (FIG. 5) for limiting the size of any particles which may be pulled into the pump means 80 during the actuation thereof. The strainer means 82 may be of any suitable or desired construction, and as particularly shown herein is preferably a box-like structure constructed from polypropylene material and perforated with a plurality of spaced relatively small diameter apertures, as for example approximately 3/16" in diameter, but not limited thereto. The strainer 82 may be secured to the cabinet or housing 18 in any suitable manner, and preferably with PVC bolts, or the like.

The float switch means 78 as shown herein preferably comprises a hollow plastic ball 84 disposed in the sump 70 and to one end of a stainless steel rod 86 which extends through an elongated aperture (not shown) provided in the sidewall 30 and into operable connection with the switch means 78 for automatic actuation thereof, as is well known. The switch means 78 is secured to a suitable pedestal means 88 which is mounted on a pad means 90 upon which the pump means 80 is also mounted. The switch means 78 may be operably secured to the pump means in any suitable or well known manner (not shown) for actuation of the pump 80 when the level of the fluid within the sump 70 rises to the preselected level therefor.

The pump 80 is in communication with the pump inlet port 83 of the sump 70 through a suitable tube or conduit 92 and draws fluid from the sump into the fluid end 94 of the pump when the pump is actuated. The fluid end 94 of the pump 80 is also in communication with a distributing pipe means 96 through a tubing 97 which extends to a PVC check valve (not shown) attached to the sidewall of the settling tank 14 and open to the interior of the distributing pipe 96. The distributing pipe 96 is preferably perforated and extends into the interior of the settling tank 14 which distributes or discharges the fluid from the pump 80 into the interior of the tank 14. The conduits or tubing carrying the fluid to and from the pump 80 is preferably a Myon tubing, but not limited thereto, and the pump 80, switch 78 and mounting therefor are preferably covered by a polypropylene cover or protective housing 98 secured to the outer periphery of the sidewall 30. The housing 98 is provided with suitable openings (not shown) for the tubing and electrical conduit (not shown) but provides protection of the covered elements from water being accidentally or inadvertently splashed thereon.

The first settling tank 14 comprises a housing 100 preferably constructed from polypropylene and having suitable girth support means 102 rigidly secured to the inner periphery thereof in any suitable or well known manner. A centrally disposed vertical partition 104 is secured within the housing 100 and separates the interior thereof into two compartments 106 and 108, each of which is sealed from the other. The compartment 106 is the "dirty water" or "dirty fluid" compartment and receives the fluid from the pump 80 therein as it is distributed through the pipe 96. The lower end of the compartment 106 is provided with a pair of inwardly diverging panels 110 and 112 forming a substantially V-shaped configuration for the bottom of the chamber 106. The heavier particles present in the fluid deposited in the chamber 106 fall to the bottom of the chamber by gravity and are contained in the V-shaped bottom portion thereof. Suitable drain plug means 114 is provided in the housing 100 in the proximity of the "Vee" at the lower portion of the chamber 106 for facilitating draining or removal of debris, sludge, or the like from the chamber 106 as required and as is well known. An aperture (not shown) is provided in the partition 104 in the general proximity of the upper end of the chamber 106 to provide communication between the chambers 106 and 108. When the level of the clearer portion of the fluid rises within the chamber 106 to the height of the aperture, the fluid flows through the aperture and into the chamber 108.

The bottom of the chamber 108 is preferably substantially flat, and a suitable centrally disposed reactor 116 is rigidly secured to the bottom of the chamber 108 in any well known manner. The reactor as shown herein is preferably a twenty inch diameter tank thirty-six inches in height and constructed from one-eighth inch polypropylene. A suitable float and switch apparatus (not shown) is mounted in the tank or chamber 108 in any well known manner, and is operably connected with three independent pumping units 118, 120 and 122. When the desired or preselected fluid level is attained by the fluid accumulating within the chamber 108, the float and switch means (not shown) simultaneously activates the pumps 118, 120 and 122 for moving the fluid through the chemical process for removal or reduction of the organic matter from the fluid.

The pump 118 draws or pulls the water or fluid from the chamber 108 and delivers the fluid into the bottom portion of a cylinder or housing 124 mounted exteriorly of the housing 100 and preferably above the pump 118. The pump preferably discharges the fluid from the chamber 108 at a one gallon per minute flow control, but is not limited thereto. The cylinder or housing 124 is provided with a removable cover 126 for access to the interior thereof, and an outlet port means 128 in the proximity of the upper end thereof. A suitable quantity of calcium hypochlorite is deposited within the housing or cylinder 124. A preferred quantity of calcium hypochlorite is that contained in twenty-five Pittabs, Pittabs being a brand name for hypochlorite. The hypochlorite treated fluid moves from the cylinder 124 to an ultra violet light station 130 through suitable conduit means 132. The ultra violet light station 130 is mounted exteriorly of the housing 100 and is preferably a thirty watt bulb and a strong ballast, but not limited thereto. The combination of the hypochlorite and the ultra violet light breaks down the organics in the fluid, and it has been found preferable to achieve this step before treatment of the fluid for removal or reducing of heavy metals.

The fluid leaves the ultra violet light station 130 through a suitable PVC Tee 134 and into a suitable hose or conduit 136 which carries the fluid into the reactor tank 116. A housing or cylinder 138 is mounted in the proximity of the cylinder or housing 124 and contains a ferric chloride solution. The solution in the cylinder 138 is preferably ferric chloride sixty-four percent that is diluted with water to produce at twenty-five percent ferric chloride and seventy-five percent water solution. This ferric chloride solution is moved through the pump 122, which is a metering pump, and through a conduit or hose 140 for discharge into the line 136 substantially immediately downstream of the Tee 134. The fluid stream is then discharged into the interior of the reactor tank 116 where the fluid is constantly stirred or agitated by the pump 120. Of course, the hoses or conduits extend from the respective pumps and into the interior of the housing 100 through suitable sealed apertures 142, as is well known.

The fluid in the reactor tank 116 is monitored for PH readings in any well known manner. If the PH reading exceeds ten, the PH control opens a suitable solenoid valve means 144 which establishes communication between a hydrochloric acid supply tank 146 and the interior of the reactor 116 through a conduit or hose 148. The tank 146 is preferably in the form of a plastic bottle which is disposed on the cover or top of the housing 100. A pump 150 is actuated in any well known manner for moving the fluid from the reactor tank 116 into the second settling tank unit 16. The pumps and housings or cylinders associated with the unit 14 are preferably covered by a suitable shroud or housing 152 for protection thereof.

The settling tank unit 16 is of a generally similar construction to that of the settling tank unit 14, with the exception that it does not include a reactor tank, and does not have pumping units and chemical solution tanks and reservoirs. The unit 16 comprises a housing 154 generally similar to the housing 100, and having a central vertically disposed partition 156 provided therein to separate the interior thereof into two compartments 158 and 160. A suitable inlet port means 162 is provided in the sidewall of the housing 154 and in the proximity of the upper end thereof for receiving the fluid from the pump 150. A baffle means 164 is secured within the interior of the chamber 158 in the proximity of the inlet port means 162 for directing the incoming fluid downwardly within the chamber 158. A pair of inwardly diverging plates 166 and 168 are provided in the bottom portion of the chamber 158 to provide a substantially V-shaped bottom for the chamber, and any heavy particles remaining in the fluid settle into the Vee of the chamber 158 as the fluid is accumulated therein.

An aperture 170 is provided in the partition 156 to establish communication between the compartments 158 and 160. A dam means 172 is mounted in the chamber 158 and secured to the partition 156 in the proximity of the aperture 170. As the level of the clear or clean fluid rises within the chamber 158, the clear or clean fluid may flow over the upper end of the dam 172 and through the aperture 170 where it is directed into the interior of the chamber 160. The fluid being directed or deposited in the chamber 160 is essentially free of organic and toxic materials. A suitable pump means 174 is mounted exteriorly of the housing 154 and is in suitable communication with the interior of the chamber 160 for withdrawing the clean or clear fluid therefrom for ultimate disposal thereof.

From the foregoing, it will be apparent that the present invention provides a novel method and means for the elimination or substantial reduction or organic matter and toxic materials from waste water or drainage fluids from a radiator cleaning operation or the like. The novel apparatus comprises three basic units, a first unit comprising a flush booth wherein the radiator may be exteriorly sprayed and interiorly flushed in the usual manner, and a multi-chambered sump means arranged for capturing the draining fluid from the radiator spray and/or flush operation for the initial settling of heavy materials from the fluid; a second unit comprising a first settling tank for a further separation of heavy particles from the fluid and delivering the fluid into a holding tank for a chemical bath operation for the removal of essentially all of the undesirable organic matter from the flow stream; and a third unit comprising a second settling tank for a final separation of heavy material from the fluid whereupon a substantial clean or clear fluid may be removed from the final separation tank for delivery to a final holding compartment whereupon the fluid may be removed from the apparatus for ultimate disposal with a minimum of pollution damage to the surrounding area.

Whereas the present invention has been described in particular relation to the drawings attached hereto, it should be understood that other and further modifications, apart from those shown or suggested herein, may be made within the spirit and scope of this invention.

What is claimed is:

1. Apparatus for the reduction of undesirable pollutants from waste fluid utilized in radiator treatment operations, and comprising a first unit having a flush booth including means for exteriorly spraying and interiorly flushing a radiator with a caustic fluid thus producing a caustic waste fluid containing organic material and toxic metals selected from the group consisting of lead, copper and zinc, sump means disposed in communication with the flush booth for receiving fluid therefrom by gravity for an initial separation of heavy particles from the fluid; a second unit having a first settling compartment provided therein for receiving the fluid from the sump means to provide a first settling of the heavy components of the fluid received from the sump means, a first holding compartment in communication with the first settling compartment for receiving the lighter components of the fluid therefrom, wherein the second unit includes a reactor task means disposed in the first holding compartment, calcium hypochlorite chemical bath means disposed exteriorly of the first holding compartment for treating the fluid, ultraviolet light means disposed exteriorly of the chemical bath means and in communication therewith, for treating the hypochlorite treated fluid, ferric chloride chemical bath means for treating the fluid leaving said ultraviolet light means and for passing the fluid to said reactor tank means, and pump means operable for moving the fluid from the holding compartment through the chemical bath means and ultraviolet light means and to the reactor tank means for effecting reduction of the organic material and toxic metal content of said fluid; and a third unit having a second settling compartment provided therein for receiving the fluid from the first holding compartment and providing a second settling of the heavy component of the fluid including said toxic metals and a second holding compartment in communication with the second settling compartment for receiving substantially clear fluid therefrom for ultimate discharge thereof from the apparatus.

2. Apparatus as set forth in claim 1 wherein the sump means is multi-compartmented.

3. Apparatus as set forth in claim 1 wherein the first unit comprises housing means having a perforated horizontally disposed partition provided therein between the flush booth and sump means for directing the fluid to the sump means, and the sump means comprises a plurality of upstanding partitions disposed beneath the perforated partition for providing a plurality of sump compartments, each of the partitions being of a sequentially shorter height than the preceeding partition whereby the fluid moving through the sump means cascades between the compartments in a manner providing for separation of heavier particles from the fluid in each of the compartments.

4. Apparatus as set forth in claim 3 and including removable cover means provided for the compartments, said cover means being provided with aperture means in communication with a first of said compartments for delivery of the fluid initially to said first compartment for initiation of the cascading of the fluid throughout the multiple compartments.

5. Apparatus as set forth in claim 4 wherein fluid level control means is provided in the last of said compartments and responsive to the level of the fluid in the said last compartment for activation of pump means for delivery of the fluid from the last compartment to the first settling compartment of the second unit.

6. Apparatus as set forth in claim 1 wherein the second unit includes a housing having a vertical partition provided therein for separation of the interior of the housing into the first settling compartment and first holding compartment, and means provided in the partition for providing selective communication of fluid from the first settling compartment to the first holding compartment.

7. Apparatus as set forth in claim 1 wherein the third unit includes a housing having a vertical partition provided wherein for separation of the interior of the housing into the second settling compartment and second holding compartment, inlet port means provided in the housing for communicating fluid from the first holding compartment to the second settling compartment, and outlet port means provided in the partition providing selective communication of fluid from the second settling compartment to the second holding compartment.

8. Apparatus as set forth in claim 7 wherein baffle means is provided in the second settling compartment and disposed in the proximity of the inlet port means for directing the fluid entering the second settling compartment in a downward direction, and dam means provided in the second settling compartment in the proximity of the outlet port means for controlling the discharge of the fluid from the second settling compartment to the second holding compartment.

9. Apparatus as set forth in claim 1 wherein the bottom of the first settling compartment is substantially V-shaped for the accumulation of heavier components of the fluid therein for facilitating removal thereof subsequent to the settling operation.

10. Apparatus as set forth in claim 1 wherein the bottom of the second settling compartment is substantially V-shaped for the accumulation of heavier components of the fluid therein for facilitating removal thereof subsequent to the settling operation.

11. A method for the reduction of undesirable pollutants from waste fluid produced in a radiator treatment operation, including exteriorly spraying and interiorly flushing a radiator with a caustic fluid thus producing a waste fluid containing organic material and toxic metals selected from the group consisting of lead, copper and zinc, and comprising the steps of initially capturing the waste fluid in a sump, cascading the fluid through the sump for an initial separation of heavier particles from the fluid, directing the fluid into a first settling compartment of separation of the heavier components of the fluid from the lighter components thereof, directing the fluid into a first holding compartment, passing the fluid through a calcium hypochlorite chemical bath, subjecting the chemically treated fluid to an ultra violet light the combination of calcium hypochorite and ultraviolet light effecting a reduction of said organic material in said fluid, treating said fluid with an effective amount of ferric chloride and directing the fluid into a reactor tank to reduce the toxic metal content of said fluid, moving the fluid from the reactor tank to a second settling compartment for a further separation of the heavier components of the fluid including said toxic metals from the lighter components thereof, and directing substantially clean fluid into a second holding tank for ultimate disposal of the processed fluid.

12. A method as set forth in claim 11 wherein the chemical bath is a hypochlorite solution.

13. A method as set forth in claim 12 wherein the ferric chloride added to the fluid is a ferric chloride solution.

14. A method as set forth in claim 13 wherein the ferric chloride solution comprises twenty-five percent ferric chloride and seventy-five percent water.

* * * * *